No. 847,812. PATENTED MAR. 19, 1907.
G. R. PETERSON & W. E. MOEN.
TWINE CUTTER.
APPLICATION FILED OCT. 13, 1906.

WITNESSES
William P. Goebel

INVENTORS
Gustave R. Peterson
William E. Moen
BY Munn & Co
ATTORNEYS

UNITED STATES PATENT OFFICE.

GUSTAVE RUDOLPH PETERSON AND WILLIAM E. MOEN, OF RED JACKET, MICHIGAN.

TWINE-CUTTER.

No. 847,812.  Specification of Letters Patent.  Patented March 19, 1907.

Application filed October 13, 1906. Serial No. 338,760.

*To all whom it may concern:*

Be it known that we, GUSTAVE RUDOLPH PETERSON and WILLIAM E. MOEN, citizens of the United States, and residents of Red Jacket, in the county of Houghton and State of Michigan, have invented a new and Improved Twine-Cutter, of which the following is a full, clear, and exact description.

This invention is an improvement in twine-cutters, providing a novel device which is to be carried at the free end of a ball of twine or the like and employed in cutting it when desired to sever a piece of twine therefrom. The means for attaching the device to the twine bindingly engages or pinches it when not in use and while the twine is being cut, thereby preventing the accidental separation of the device and twine; but said means is easily operable to release the twine to pass a fresh length therethrough or remove it entirely from the ball.

Reference is to be had to the accompanying drawings, forming a part of this specification, in which similar characters of reference indicate corresponding parts in all the figures.

Figure 1:
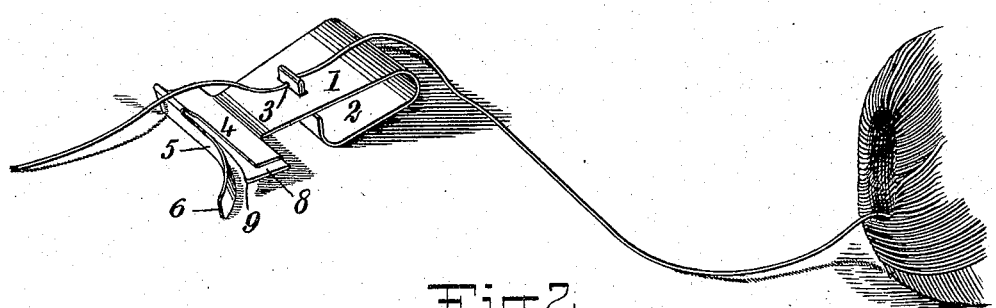
Figure 2:
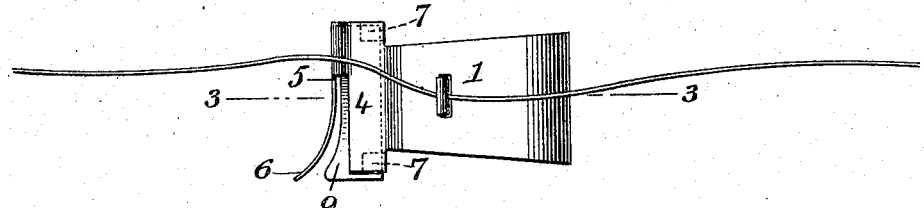
Figure 3:
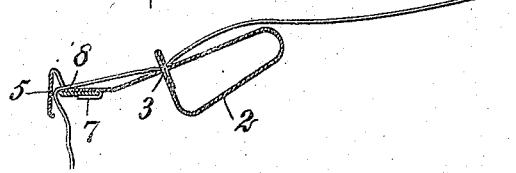
Figure 4:
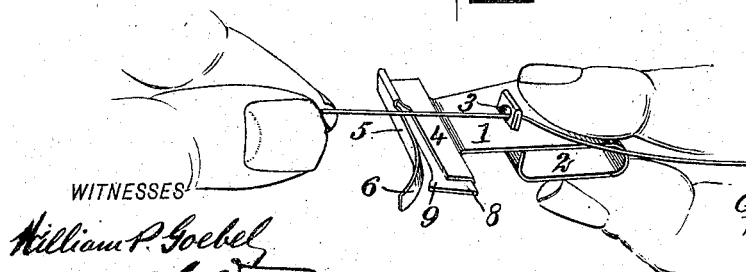

Figure 1 is a perspective view of our improved twine-cutter, showing the manner in which it is attached to the free end of a ball of twine. Fig. 2 is a plan view of the same. Fig. 3 is a longitudinal central section on the line 3 3 of Fig. 2; and Fig. 4 is a perspective view of the device, showing the manner in which it is used.

The invention comprises a sheet-metal body 1, having its rear end reversely bent upon itself, forming a spring finger-piece 2, with the extremity thereof upwardly turned and reduced in width, which passes through a slot provided in the body 1. This extremity is bent upon itself, as best shown in Figs. 3 and 4, and has an aperture 3 passing through it, which is normally drawn by the spring finger-piece 2 below the upper surface of the body 1, providing a jaw for clamping or pinching the twine and holding the device in fixed relation thereon.

The forward end of the body 1 is constructed with a T-head 4, which is extended at one end to form a guard 5, the latter being at right angles to the head with its free end preferably outwardly curved, as indicated at 6. All the parts thus far described are constructed of a single piece of sheet metal, as also tabs 7, provided at the rear edge of the T-head 4, said tabs being bent upon the head to bindingly engage a knife-blade 8 therebetween. This plate, as shown, is constructed of thin sheet-steel with a forward cutting edge slightly spaced from the guard 5 and with a somewhat-widened portion 9 adjacent to the curved end 6 of said guard.

In the use of the device the twine is passed through the apertures 3 with the free end overhanging the guard 5, as shown in the drawing-figures. When it is desired to sever a piece of twine, the spring finger-piece 2 is pressed inwardly, as illustrated in Fig. 4, to release the twine, which is thereafter drawn through the aperture 3 until a piece of the length required extends beyond the knife-blade. The spring finger-piece 2 is thereafter released, acting to permit the aperture 3 to again pinch the twine against the body 1. The free end of the twine is then passed between the guard 6 and blade 9, as shown in Fig. 3, and drawn against the latter, which severs it.

Although we have described the invention in detail, the precise embodiment is not material, provided the essential characteristics are employed, as pointed out in the annexed claims.

Having thus described our invention, we claim as new and desire to secure by Letters Patent—

1. A device of the character described comprising a sheet-metal body having one of its ends bent upon itself to form a spring finger-piece, the extremity of said finger-piece being bent to pass through a slot in said body, said extremity having an aperture through which twine or the like is adapted to be passed, and a knife carried by said body for cutting the twine.

2. A device of the character described comprising a sheet-metal body having one of its ends apertured and bent to pass through a slot in the body, said apertured end coacting with the body to bindingly engage or pinch twine or the like, and means carried by said body for cutting the twine.

3. A device of the character described comprising a sheet-metal body having means for bindingly engaging it to twine or the like, and a knife rigidly attached at one end of said body, the end of said body adjacent to said knife being downwardly turned in front of the cutting edge of the knife, providing a guard therefor.

4. A device of the character described, comprising a body, apertured means passing through said body for receiving twine or the like in the aperture thereof and bindingly engaging it against the body and means carried by said body for cutting the twine.

In testimony whereof we have signed our names to this specification in the presence of two subscribing witnesses.

GUSTAVE RUDOLPH PETERSON.
WILLIAM E. MOEN.

Witnesses:
MICHAEL PETERSON,
P. J. NAPPA.